United States Patent
Ko et al.

(10) Patent No.: US 7,664,088 B2
(45) Date of Patent: Feb. 16, 2010

(54) METHOD FOR PROVIDING QOS USING FLOW LABEL IN PROVIDING MULTIMEDIA SERVICE IN IPV6 NETWORK AND SYSTEM APPLYING THE SAME

(75) Inventors: Nam Seok Ko, Daejeon (KR); Sung Back Hong, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 451 days.

(21) Appl. No.: 11/635,296

(22) Filed: Dec. 7, 2006

(65) Prior Publication Data

US 2007/0133547 A1 Jun. 14, 2007

(30) Foreign Application Priority Data

Dec. 8, 2005 (KR) ...................... 10-2005-0119202
Jun. 7, 2006 (KR) ...................... 10-2006-0050901

(51) Int. Cl.
*H04Q 7/24* (2006.01)
*H04J 3/16* (2006.01)

(52) U.S. Cl. ...................... 370/338; 370/468
(58) Field of Classification Search ........................ None
See application file for complete search history.

(56) References Cited

U.S. PATENT DOCUMENTS

| | | | |
|---|---|---|---|
| 7,304,996 B1* | 12/2007 | Swenson et al. | 370/394 |
| 2003/0043802 A1* | 3/2003 | Yazaki et al. | 370/389 |
| 2005/0089030 A1 | 4/2005 | Wilson | |
| 2006/0209891 A1* | 9/2006 | Yamada et al. | 370/468 |
| 2006/0251043 A1* | 11/2006 | Madour et al. | 370/349 |

FOREIGN PATENT DOCUMENTS

| | | |
|---|---|---|
| JP | 2000-174811 A | 6/2000 |
| JP | 2005-073106 A | 3/2005 |
| JP | 2005295217 | 10/2005 |
| KR | 1020030017455 | 3/2003 |
| KR | 10-2003-0089747 | 11/2003 |
| KR | 2004-0054110 | 6/2004 |
| KR | 1020050018041 | 2/2005 |
| KR | 1020060028973 | 4/2006 |
| WO | 2004/112335 A1 | 12/2004 |

* cited by examiner

*Primary Examiner*—Hong Cho
*Assistant Examiner*—Eunsook Choi
(74) *Attorney, Agent, or Firm*—Ladas & Parry LLP

(57) ABSTRACT

Provided is a QoS providing method using a flow label in providing multimedia service in an IPv6 network and a system applying the same. According to the method, a signal connection server extracts session information from a communication request response signal transmitted from a destination in response to a communication request signal of a source, and transmits the extracted session information to a QoS provisioning server. The QoS provisioning server receives the session information, and generates a session key including flow label, and sets QOS information corresponding to the session key. The QoS provisioning server transmits the session key and the QoS information to an IPv6 node, and transmits QoS provisioning completion information to the signal connection server. When the signal connection server receives the QoS provisioning completion information, the signal connection server transmits the received communication request response signal to the source. The IPv6 node forwards an introduced packet on the basis of the transmitted session key and the QoS information.

22 Claims, 10 Drawing Sheets

QoS POLICY TABLE (200)

| KEY VALUE (SRC, DST, Next Header, Flow Label) (210) | QoS Profile (220) |
|---|---|
| SRC =2201:056D::112E:144A:1E24, DST = 2202:056C::102E:144A:1E00, Next Header=TCP, Flow Label =80000 | Traffic Type = GR, B/W = 2Mbps |
| SRC =2201:056D::112E:144A:1E34, DST = 2202:056C::102E:144A:1E01, Next Header=TCP, Flow Label =90000 | Traffic Type = AR |
| ... | ... |
| ... | ... |

FIG. 5

SIP REQUEST MESSAGE FORMAT FOR IPv4 (300)

Request line (310): INVITE sip:User2@there.com SIP/2.0

Headers (320):
- Via: SIP/2.0/UDP here.com:5060
- From: BigGuy <sip:User1@here.com>
- To: LittleGuy <sip:User2@there.com>
- Call-ID: 12345600@here.com
- CSeq: 1 INVITE
- Subject: Happy Christmas
- Contact: BigGuy <sip:User1@here.com>
- Content-Type: application/sdp
- Content-Length: 147

Message body (330):
```
v=0
o=User1 2890844526 2890844526 IN IP4 here.com
s=Session SDP
c=IN IP4 100.101.102.103
t=0 0
m=audio 49172 RTP/AVP 0
a=rtpmap:0 PCMU/8000
```

PRIOR ART
FIG. 6

CONVENTIONAL SIP REQUEST
MESSAGE FORMAT FOR IPv6 (400)

Request line (410)
INVITE sip:User2@there.com SIP/2.0

Headers (420)
Via: SIP/2.0/UDP here.com:5060
From: BigGuy <sip:User1@here.com>
To: LittleGuy <sip:User2@there.com>
Call-ID: 12345600@here.com
CSeq: 1 INVITE
Subject: Happy Christmas
Contact: BigGuy <sip:User1@here.com>
Content-Type: application/sdp
Content-Length: 147

Message body (430)
v=0
o=nsko 971731711378798081 0 IN IP6 2201:056D::112E:144A:1E24
s=IPv4 Session Example
p=+1 713 555 1234
c=IN IP6 FF1E:03AD::7F2E:172A:1E24
t=3338481189 3370017201
m=audio 6000 RTP/AVP 2
a=rtpmap:2 G726-32/8000

PRIOR ART
FIG. 7

PROPOSED SIP REQUEST
MESSAGE FORMAT FOR IPv6 (500)

Request line (510)
INVITE sip:User2@there.com SIP/2.0

Headers (520)
Via: SIP/2.0/UDP here.com:5060
From: BigGuy <sip:User1@here.com>
To: LittleGuy <sip:User2@there.com>
Call-ID: 12345600@here.com
CSeq: 1 INVITE
Subject: Happy Christmas
Contact: BigGuy <sip:User1@here.com>
Content-Type: application/sdp
Content-Length: 147

Message body (530)
v=0
o=nsko 971731711378798081 0 IN IP6 2201:056D::112E:144A:1E24
s=IPv6 Session Example
p=+1 713 555 1234
c=IN IP6 FF1E:03AD::7F2E:172A:1E24
t=3338481189 3370017201
m=audio 6000 RTP/AVP 2
a=rtpmap:2 G726-32/8000
a=flowlabel:80000
                    540

FIG. 8

METHOD FOR PROVIDING QOS USING FLOW LABEL IN PROVIDING MULTIMEDIA SERVICE IN IPV6 NETWORK AND SYSTEM APPLYING THE SAME

RELATED APPLICATION

The present application is based on, and claims priorities from, Korean Application Number 2005-119202, filed Dec. 8, 2005, and Korean Application Number 2006-50901, filed Jun. 7, 2006, the disclosure of which is hereby incorporated by reference herein in its entirety.

BACKGROUND OF THE INVENTION

1. Field of the Invention

The present invention relates to a method for providing Quality of Service (QoS) through session classification in an Internet protocol version 6 (IPv6) network, and more particularly, to a method for classifying sessions created between terminals or nodes and providing specialized QoS for each session in providing multimedia network service in an IPv6 network.

2. Description of the Related Art

A session in an Internet protocol (IP) network can be defined in various ways according to the fields that the identification method is considering in. However, generally a session is defined using the information of a network layer such as an IP address and the information of a transmission layer such as a transmission control protocol/user datagram protocol (TCP/UDP) port information.

For example, a session in an IPv4 network is defined using source IPv4 address, destination IPv4 address, protocol number, source TCP/UDP port number, and destination TCP/UDP port number. Similarly, a session in an IPv6 network can be defined using source IPv6 address, destination IPv6 address, next header, source TCP/UDP port number, and destination TCP/UDP port number.

Transmission layer information (a source TCP/UDP port number and a destination TCP/UDP port number) contained in an IPv6 packet exists in the form of an extension header according to the header type defined by a standard. When there are a plurality of extension headers, the transmission layer information is located at an endmost portion of each extension header. Therefore, when a plurality of extension headers exist in an IPv6 packet, there is difficulty in extracting transmission layer information in high-speed networks.

Therefore, when the beginning of an extension header of an IPv6 packet is not transmission layer header such as TCP or UDP ports. In this case, since QoS is provided to a thick session grouping sessions whose source IPv6 address, destination IPv6 address and next header are same, a specialized control cannot be performed for each 5-tuple session. In addition, when a payload is encrypted just as an encapsulating security payload exists in an IPv6 packet, transmission layer information cannot be extracted unless each node performs decoding.

SUMMARY OF THE INVENTION

Accordingly, the present invention is directed to a method for providing QoS through session classification in an IPv6 network that substantially obviates one or more problems due to limitations and disadvantages of the related art.

An object of the present invention is to provide a QoS providing method and a system applying the same, for providing specialized QoS to a packet introduced on an IPv6 network node.

Another object of the present invention is to provide a QoS providing method and a system applying the same, for providing specialized QoS for each session by identifying sessions created between terminals or nodes in providing multimedia network service in an IPv6 network.

The other object of the present invention is to provide a QoS providing method and a system applying the same, for providing easy session classification method in a high-speed interface regardless of the existence of next header in an IPv6 network, and providing specialized QoS for each identified session.

Additional advantages, objects, and features of the invention will be set forth in part in the description hereunder and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a signal connection server in an IPv6 network, the signal connection server including: a communication request signal transmission part for extracting destination information from a communication request signal transmitted from a source and transmitting a communication request signal using the extracted destination information; a ring signal transmission part for receiving a ring signal received from a destination for which the communication request signal has been received, to detect the source from the ring signal and transmitting the ring signal to the extracted source; a session information transmission part for receiving a communication request response signal transmitted from the destination in response to the transmitted communication request signal to detect session information, and transmitting the extracted session information to a QoS provisioning server for providing QoS; and a communication request response signal transmission part for, when QoS provisioning completion information is received from the QoS provisioning server in response to a session key of the transmitted session information, transmitting a communication request response signal received from the destination to the source which is the last step to create a session whose QoS is guaranteed between the source and the destination.

The session key includes flow label from the header of a packet. The session key further includes source Internet protocol version 6 (SRC IPv6) address, destination Internet protocol version 6 (DST IPv6) address, and next header value from the header of a packet.

The QoS provisioning by the QoS provisioning server includes creating session key for a session and setting QoS information corresponding to the session.

The QoS information includes traffic type information and bandwidth information for the session.

According to an aspect of the present invention, there is provided a QoS provisioning server in an IPv6 network, the QoS provisioning server including: a session key generating part for generating a session key including flow label on the basis of session information received to create session between a source and a destination; a QoS provisioning part to provision QoS information corresponding to the generated session; a QoS provisioning information transmission part for transmitting the session key and the QoS information to an IPv6 node forwarding a data packet between the source and the destination; and a QoS provisioning completion information transmission part for transmitting QoS provisioning completion information corresponding to the session key to a signal connection server relaying session setting between the source and the destination.

The session key further includes SRC IPv6 address, DST IPv6 address, and next header value of the packet header. The QoS information includes at least one of traffic type information and bandwidth information of a packet to be forwarded by the session key at the IPv6 node.

According to another aspect of the present invention, there is provided an IPv6 node including: a header information extraction part for extracting header information from a packet introduced from an IPv6 network; a flow table for storing a session key including flow label from the header of a packet between a source and a destination, QoS information for the session to store QoS information provided by a QoS provisioning server in order to guarantee QoS, and forwarding information; a flow table lookup part for looking up for a flow table entry corresponding to a session key of the packet from the flow table; a QoS & forwarding information extraction part for, when the flow table entry corresponding to the session of the packet exists on the flow table, extracting QoS information, and forwarding information corresponding to the session of the packet from the flow table; and a forwarding processor for forwarding the introduced packet according to the forwarding information on the basis of the QoS and forwarding information of the flow table.

The IPv6 node further includes a QoS information extraction part for, when the flow table entry corresponding to the session of the packet does not exist on the flow table, extracting QoS information of the introduced packet from a QoS policy table storing session key and QoS information provided by the QoS provisioning server; and a forwarding information extraction part for extracting forwarding information of the packet from an FIBv6 table containing forwarding information corresponding to a routing path of the packet; and a forwarding processor part for forwarding the introduced packet according to forwarding information extracted by the forwarding information extraction part on the basis of the QoS information extracted by the QoS information extraction part.

The IPv6 node may further include a flow table entry generating part for generating an entry of the flow table using the QoS information extracted by the QoS information extraction part and the forwarding information extracted by the forwarding information extraction part.

According to further another aspect of the present invention, there is provided an IPv6 network system including: a signal connection server for extracting session information from a communication request response signal transmitted from a destination in response to a communication request signal of a source and transmitting the extracted session information, and, when QoS provisioning completion information is received in response to the session of the transmitted session information, transmitting the communication request response signal received from the destination to the source; a QoS provisioning server for generating a session key including flow label from the session information transmitted from the signal connection server, provisioning QoS information corresponding to the session, and transmitting the QoS provisioning completion information to the signal connection server; and an IPv6 node for updating a QoS policy table using the session key and QoS information transmitted from the QoS provisioning server, and forwarding an introduced packet according to the forwarding information on the basis of the extracted QoS information.

According to still another aspect of the present invention, there is provided a QoS providing method of an IPv6 network, the method including: extracting, at a signal connection server, session information from a communication request response signal transmitted from a destination in response to a communication request signal of a source and transmitting the extracted session information to a QoS provisioning server; receiving, at the QoS provisioning server, the session information, generating a session key including flow label, and setting QoS information corresponding to the session key; transmitting, at the QoS provisioning server, the session key and the QoS information to an IPv6 node forwarding a packet, and transmitting QoS provisioning completion information to the signal connection server; when the signal connection server receives the QoS provisioning completion information, transmitting the communication request response signal received from the destination to the source; and forwarding, at the IPv6 node, an introduced packet on the basis of forwarding information from the fowarding table and the QoS information transmitted from the QoS provisioning server.

The forwarding, at the IPv6 node, includes: extracting header information from the introduced packet; looking up for a flow table entry corresponding to a session key of the header information from a flow table storing forwarding information required for routing and QoS information transmitted from the QoS provisioning server; when the flow table entry corresponding to the session key of the header information exists on the flow table, extracting QoS information and forwarding information corresponding to the session key of the header information from the flow table; and forwarding the introduced packet according to the forwarding information on the basis of the extracted QoS information.

The method further includes: when the flow table entry corresponding to the session of the introduced packet does not exist on the flow table, extracting QoS information of the introduced packet from a QoS policy table storing the session key and the QoS information provided by the QoS provisioning server; extracting forwarding information of the packet from an FIBv6 table containing forwarding information corresponding to a routing path of the packet; and forwarding the introduced packet according to the forwarding information on the basis of the extracted QoS information.

The method further includes creating an entry of the flow table using the extracted QoS information and forwarding information to update the flow table.

According to the present invention, session information including flow label is extracted from a signal exchanged for the communication connection between communication devices in order to generate a session key including flow label. QoS information corresponding to the generated session key is extracted from a QoS policy table so that an IPv6 node sets the QoS information for the session. Therefore, the IPv6 node can more easily perform session classification and QoS is guaranteed per each IPv6 session. In addition, as a session is generated and QoS information is set to the session, the IPv6 node extracts QoS information and forwarding information from a flow table when there exits a flow table entry corresponding to a session key extracted from header information of an introduced IPv6 packet, and the IPv6 node extracts QoS information and forwarding information from a QoS policy table and an FIBv6 table when there does not exist the flow table entry. At this point, the IPv6 node forwards an IPv6 packet according to the forwarding information on the basis of the extracted QoS information, thereby more easily performing a forwarding process with guaranteeing QoS in a hardware manner under a high-speed interface regardless of the existence of a flow table entry corresponding to the session of an introduced packet.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 5 is a view illustrating a detailed example of a QoS policy table stored in an IPv6 node according to an embodiment of the present invention;

FIG. 6 is a view illustrating an example of a request message format of an SIP for a general IPv4 packet;

FIG. 7 is a view illustrating an example of a request message format of an SIP for a general IPv6 packet;

FIG. 8 is a view illustrating an SIP message format for an IPv6 packet containing flow label information according to an embodiment of the present invention;

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts. Also, known functions and constructions and detailed descriptions thereof will be omitted since they would obscure the subject matter of the present invention.

The present invention provides a system and a method for more easily identifying session using network layer information such as source IP address, destination IP addresses and flow label, and providing QoS information to the identified session by allowing a signal protocol such as an SIP to contain a flow label in order to provide QoS to multimedia service in an IPv6 network.

Figure 1:
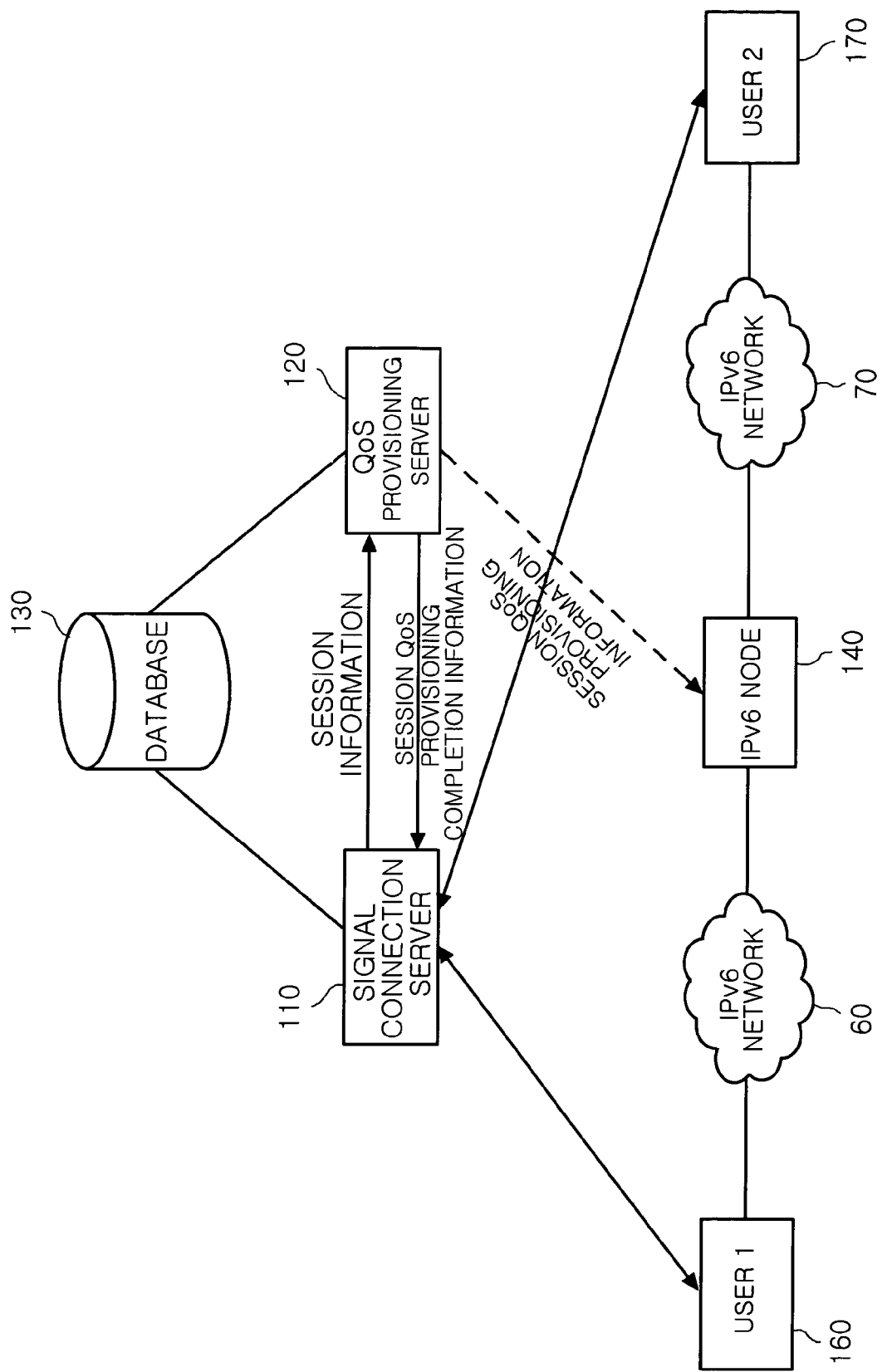
FIG. 1 is a view illustrating a system for providing QoS for each session using a flow label in providing multimedia service in an IPv6 network according to an embodiment of the present invention.

FIG. 1 is a view illustrating a system for providing QoS for each session using a flow label in providing multimedia service in an IPv6 network according to an embodiment of the present invention.

Referring to FIG. 1, an IPv6 QoS provisioning system includes an IPv6 node 140 in an aspect of forwarding, a signal connection server 110 and a QoS provisioning server 120 in an aspect of controlling the IPv6 node 140, and a database 130 shared by the signal connection server 110 and the QoS provisioning server 120.

In an aspect of forwarding, the IPv6 node 140 performs a switching function guaranteeing QoS for transmission of introduced data to a destination according to session key including flow label provided from the QoS provisioning server 120 and QoS information which is set in response thereto. Here, the IPv6 node 140 means a router in general. A detailed construction of the IPv6 node 140 will be descried with reference to FIG. 9.

Also, the IPv6 node 140 has a flow table, a QoS policy table where session QoS provisioning information is updated, and a forwarding information base version 6 (FIBv6) table in order to perform a switching function for transmitting an input packet to a destination. Here, the flow table stores forwarding and QoS information corresponding to each session. The QoS policy table means a table where session key including flow label defined according to an embodiment of the present invention and QoS information corresponding to the session are set. The FIBv6 table means a table containing forwarding information updated and stored according to routing path information of a routing table.

The signal connection server 110 provides connection service for communication between a user 1 (160) and a user 2 (170) according to a received communication connection request. In an embodiment of the present invention, the signal connection server 110 transmits a received communication request signal to a destination, transmits a ring signal received from the destination to a source, and when a communication request response signal is received from the destination, transmits session information to the QoS provisioning server 120 in response to the received communication request response signal. Also, when QoS provisioning completion information for a session is received from the QoS provisioning server 120 in response to the session information transmitted to the QoS provisioning server 120, the signal connection server 110 transmits a communication request response signal received from the destination to the source.

Figure 2:
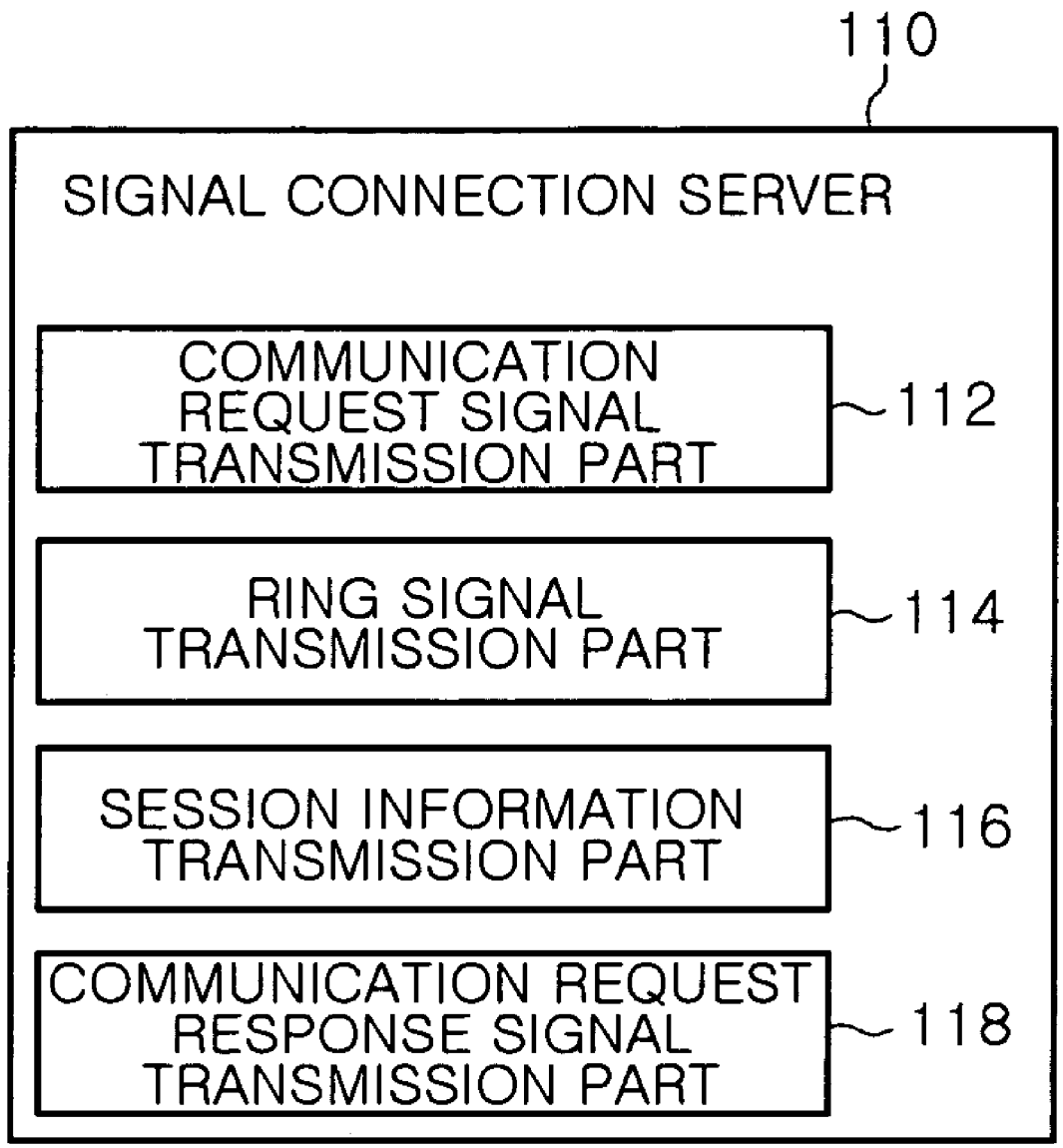
FIG. 2 is a schematic block diagram of the signal connection server of FIG. 1 according to an embodiment of the present invention.

FIG. 2 is a schematic block diagram of the signal connection server of FIG. 1 according to an embodiment of the present invention. The signal connection server 110 includes a communication request signal transmission part 112, a ring signal transmission part 114, a session information transmission part 116, and a communication request response signal transmission part 118.

The communication request signal transmission part 112 extracts a destination from a received communication request signal and transmits the received communication request signal to the extracted destination. The ring signal transmission part 114 receives a ring signal received from the destination to which the communication request signal has been transmitted, extracts a source from the ring signal, and transmits the ring signal to the extracted source.

When receiving a communication request response signal in response to a communication request signal transmitted from the destination that has transmitted a ring signal, the session information transmission part 116 extracts session information for the received communication request response signal and transmits the extracted session information to the QoS provisioning server 120. When receiving QoS provisioning completion information for a session from the QoS provisioning server 120 in response to the session information transmitted from the session information transmission part 116, the communication request response signal transmission part 118 transmits the communication request response signal received from the destination to the source.

For session classification for an IPv6 packet of an IPv6 node 140, the QoS provisioning server 120 adds a flow label to the key value for a session of an IPv6 packet to set session key, and sets a QoS value for the session and provides the QoS value to the IPv6 node 140.

Figure 3:
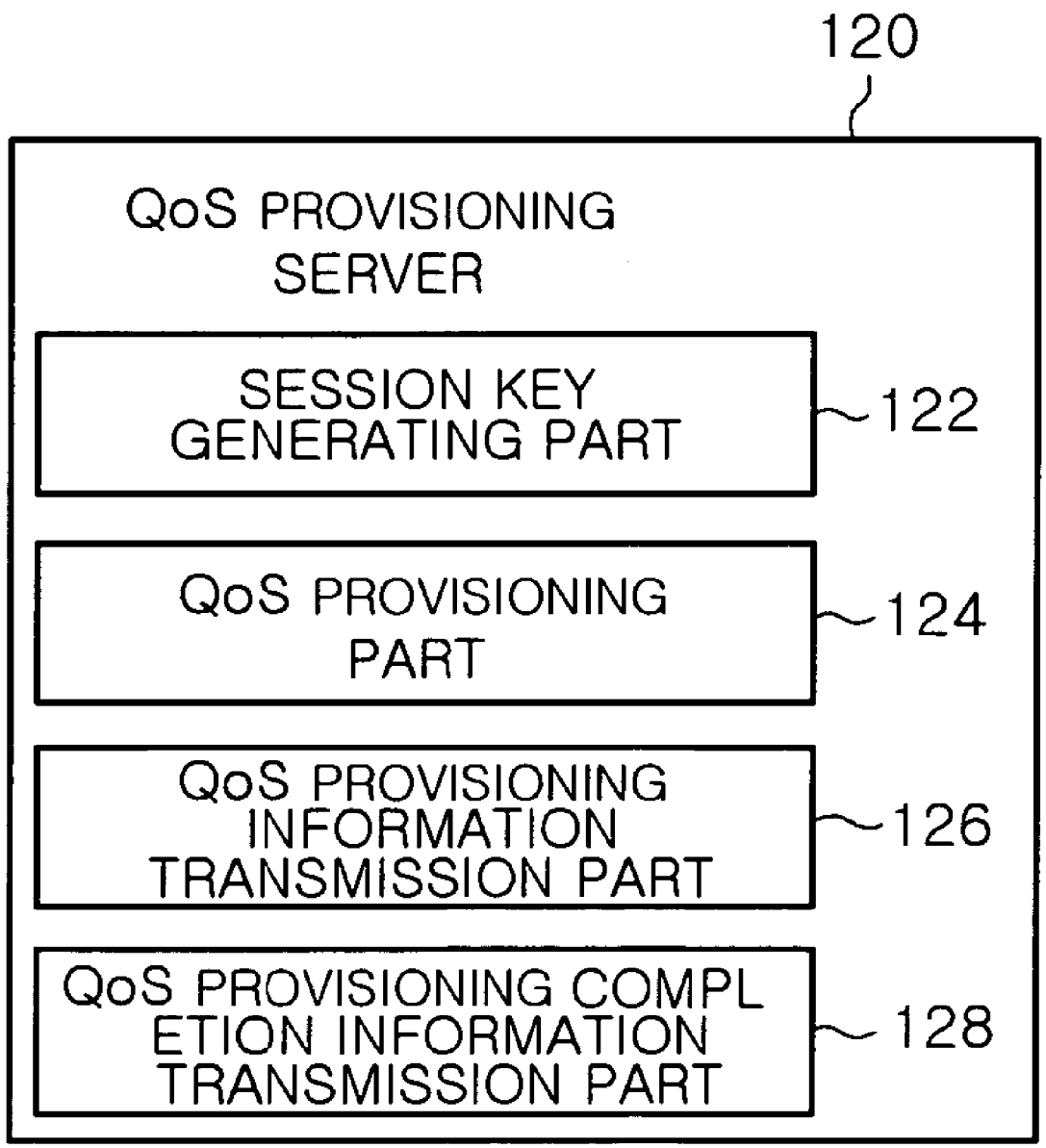
FIG. 3 is a schematic block diagram of the QoS provisioning server of FIG. 1 according to an embodiment of the present invention.

FIG. 3 is a schematic block diagram of the QoS provisioning server of FIG. 1 according to an embodiment of the present invention. The QoS provisioning server 120 includes a session key generation part 122, a QoS provisioning part 124, a QoS provisioning information transmission part 126, and a QoS provisioning completion information transmission part 128.

The session key generating part 122 generates a session key including flow label on the basis of session information provided from the session information transmission part 116 of the signal connection server 110. The QoS provisioning information transmission part 126 transmits the QoS provisioning information which is set by the QoS provisioning part 124 to the IPv6 node 140. When QoS provisioning by the QoS provisioning part 124 is completed, the QoS provisioning completion information transmission part 128 transmits QoS provisioning completion information for a session to the signal connection server 110.

The database 130 stores and manages the resources which is required for provisioning session key including flow label and provisioning QoS value for the session. Accordingly, the QoS provisioning server 120 checks resource information stored in the database 130 and when there are available resources, performs QoS provisioning for a session.

Accordingly, the IPv6 node 140 extracts forwarding information and QoS information from a corresponding table and performs forwarding of a packet depending on existence of a flow table (entry) corresponding to the session of a received packet when performing multimedia service. When there exists the flow table corresponding to the session key of the received packet, the IPv6 node 140 extracts forwarding information and QoS information from the flow table and forwards a packet according to the forwarding information on the basis of the extracted QoS information. When there does not exist the flow table entry corresponding to the session of the received packet, the IPv6 node 140 extracts QoS information from a QoS policy table and extracts forwarding information from an FIBv6 table to generate an entry of a flow table, and forwards a packet on the basis of the entry.

Figure 4:
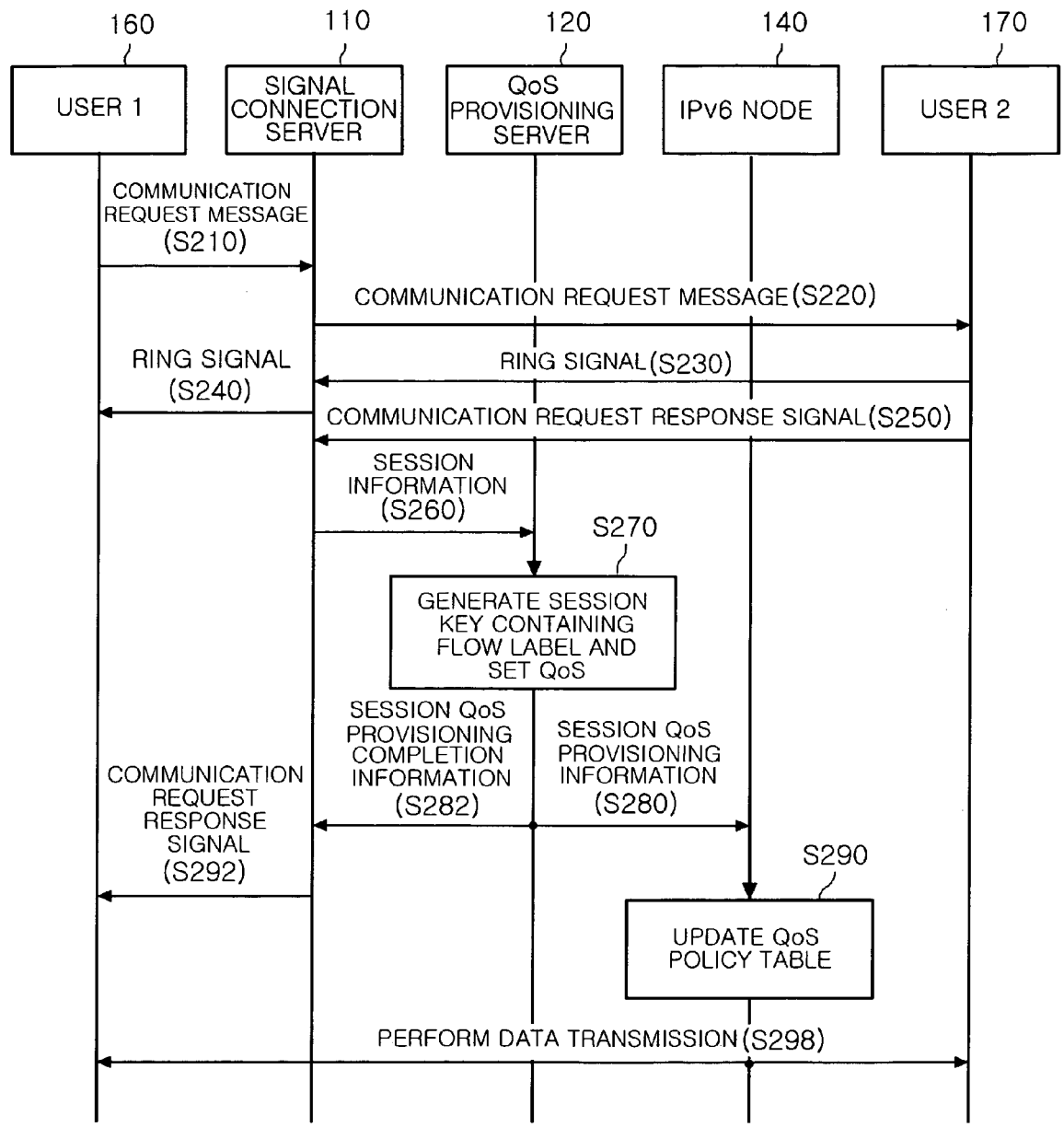
FIG. 4 is a view illustrating session key generation using an IPv6 flow label and a QoS provisioning process corresponding thereto according to an embodiment of the present invention.

FIG. 4 is a view illustrating session key generation using an IPv6 flow label and a QoS providing process corresponding thereto according to an embodiment of the present invention.

First, when intending to create a session to a user 2 (170), a user 1(160) transmits a message "communication invite to a user 2" to the signal connection server 110 (S210). The signal connection server 110 receives the message "communication invite to a user 2" from the user 1(160) and transmits the message to a user 2(170) (S220).

When receiving the message "communication invite to a user 2" from the signal connection server 110, the user 2(170) transmits a ringing message signal to the signal connection server 110 in response thereto (S230). The signal connection server 110 transmits the ringing message signal received from the user 2(170) to the user 1(160)(S240).

After transmitting the ring message signal, the user 2(170) transmits a response signal to the signal connection server 110 in response to a communication request of a user 1(160) (S250). When receiving the communication request response signal from the user 2(170), the signal connection server 110 transmits IPv6 session information between the user 1(160) and the user 2(170) to the QoS provisioning server 120 (S260).

When receiving the session information transmitted from the signal connection server 11, the QoS provisioning server 120 checks whether resources required for creating session key including flow label and setting QoS information corresponding thereto are available through the database 130. When there exist available resources in the database 130, the QoS provisioning server 120 generates session key including flow label with reference to session information and sets QoS information corresponding to the generated session key (S270). The QoS provisioning server 120 transmits the generated session key and session QoS provisioning information to the IPv6 node 140 (S280). Also, the QoS provisioning server 120 transmits session QoS provisioning completion information by the provided session information to the signal connection server 110 to inform that QoS providing for a session is possible (S282).

The IPv6 node 140 updates a QoS policy table using a session key and session QoS provisioning information transmitted from the QoS provisioning server 120 to allow QoS to be provided to a packet that passes the IPv6 node 140 (S290). Also, when receiving session QoS provisioning completion information from the QoS provisioning server 120, the signal connection server 110 transmits the communication request response signal received from the user 2(170) in an operation S250 to the user 1(160) (S292).

Accordingly, the IPv6 node 140 performs routing for transmission of actual data between the user 1(160) and the user 2(170) via IPv6 networks 60 and 70 using the QoS policy table where session key and QoS information are updated (S298).

FIG. 5 is a view illustrating a detailed example of a QoS policy table stored in an IPv6 node 140 according to an embodiment of the present invention.

Referring to FIG. 5, a QoS policy table 200 is a table for providing QoS for multimedia traffic of an IPv6, and may be a hash table in general. For the hash function, a variety of methods such as cycle redundancy check (CRC), exclusive OR (XOR) widely used in general may be used. A QoS policy table 200 may include a session key 210 and QoS information 220 corresponding to each session key.

Here, the session key 210 includes SRC IPv6 address, DST IPv6 address, next header value, and flow label. The QoS information 220 is a QoS value for a session that matches to a corresponding session key, and includes a traffic type and bandwidth (B/W) information.

Referring to FIG. 5, for an example of a session key, SRC IPv6 address is "2201:056D::112E:144A:1E24", DST IPv6 address is "2202:056C::102E:144A:1E00", next header is TCP, and flow label is a session of "80000". In this case, QoS information 220 for a session key represents a traffic type is a "guaranteed rate (GR)" and a bandwidth corresponding thereto is 2 Mbps.

FIG. 6 is a view illustrating an example of a request message format of an SIP for a general IPv4 packet.

Referring to FIG. 6, an SIP request message 300 for an IPv4 packet includes a request line 310, a plurality of headers 320, and a message body 330.

The request line 310 represents what a request is, for which a request is, and which protocol version is used.

Each of the headers 320 includes more detailed information for the requests contained in the request line 310. Each header 320 has a construction in which a header name, a colon, and a header value are sequentially positioned. For generation of such information, calling party information and called party information are used.

The message body 330 is divided into a header and a blank line, and includes description for a session. The message body 330 shows that a user 1 of "here.com" uses "100.101.102.103" for IPv4 address, and "49172" for UDP port, and transmits audio information using RTP protocol, and the audio information includes u-law pulse code modulation (PCM) coding of 8 KHz (8,000 Hz).

FIG. 7 is a view illustrating an example of a request message format of SIP for a general IPv6 packet.

Referring to FIG. 7, an SIP request message 400 for an IPv6 packet includes a request line 410, a plurality of headers 420, and a message body 430 as in an IPv4 packet. An SIP request message 400 for an IPv6 packet is different from that for an IPv4 packet in that IP6 is used for an address and an actual address of IPv6 is used in order to tell a protocol of an IPv6 from that of an IPv4.

As described above, the SIP message 400 for a general IPv6 packet includes only UDP port information including address information as in an IPv4. Therefore, when session information is set on an IPv6 node using only this information, layer-4 information such as UDP port should be found so that session information is checked even when a predetermined next header exists for all IPv6 packets input from an IPv6 node. Such an operation is difficult to process by hardware in high-speed actual interface of several Gbps. FIG. 6 illustrates an SIP message format for an IPv6 packet that solves this disadvantage.

FIG. 8 is a view illustrating an SIP message format for an IPv6 packet containing flow label information according to an embodiment of the present invention.

Referring to FIG. 8, an SIP message 500 for an IPv6 packet proposed by an embodiment of the present invention includes a request line 510, a plurality of headers 520, and a message body 530 as in FIG. 5.

Here, the SIP message 500 for the IPv6 packet according to the present embodiment includes a flow label 540 for a field of the message body 530 in order to provide QoS to IPv6 multimedia traffic to allow the flow label 540 to be included in a session key 210 of the QoS policy table 200 of the IPv6 node 140.

Figure 9:
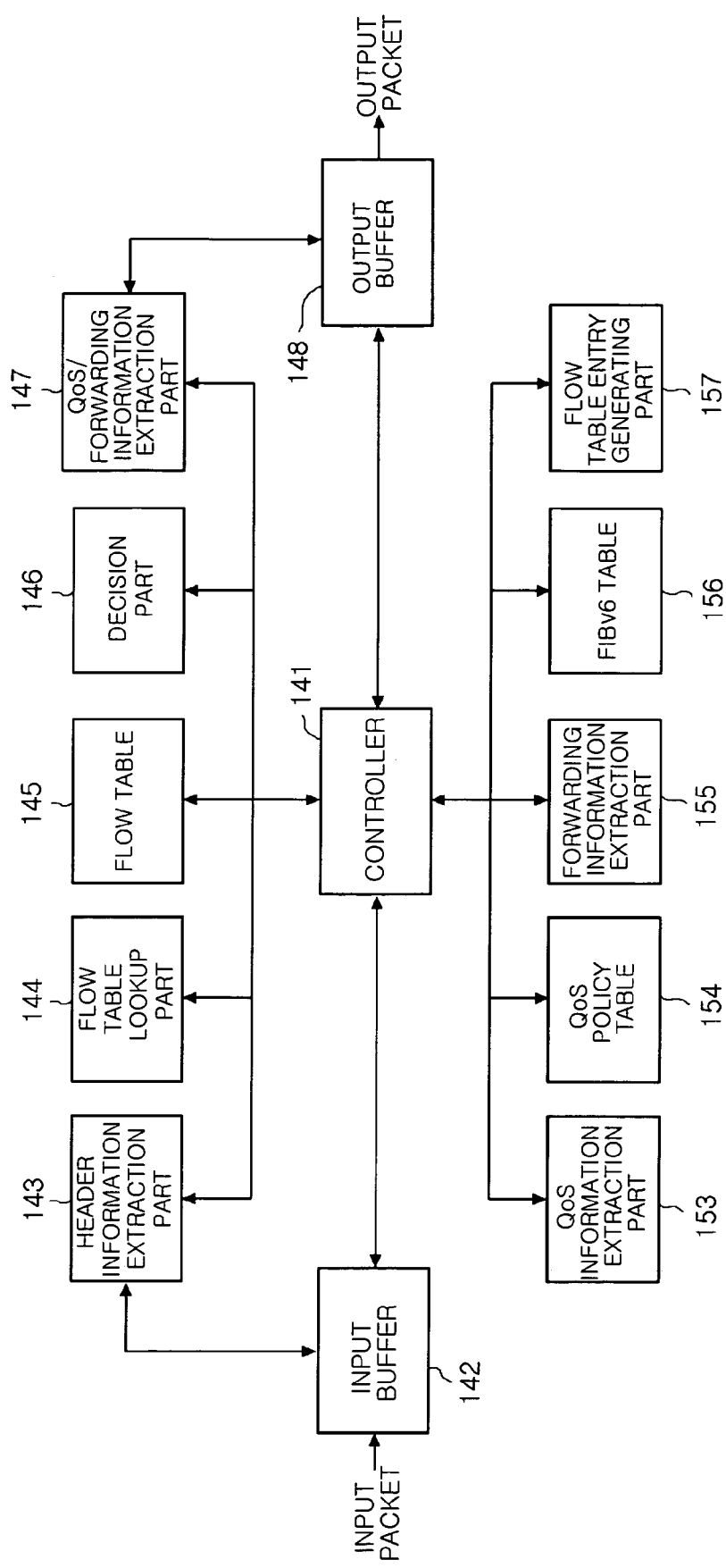
FIG. 9 is a detailed block diagram of an IPv6 node of FIG. 1 according to an embodiment of the present invention.

FIG. 9 is a detailed block diagram of an IPv6 node 140 of FIG. 1 according to an embodiment of the present invention.

Referring to FIG. 9, the IPv6 node 140 includes a controller 141, an input buffer 142, a header information extraction part 143, a flow table lookup part 144, a flow table 145, a decision part 146, a QoS/forwarding information extracting part 147, an output buffer 148, a QoS information extracting part 153, a QoS policy table 154, a forwarding information extracting part 155, an FIBv6 table 156, and a flow table entry generating part 157.

The controller 141 controls overall operations of the IPv6 node 140. The input buffer 142 performs an output buffering operation according to an input of an IPv6 packet. The header information extraction part 143 extracts header information of an IPv6 packet introduced to the input buffer 142. The flow table lookup part 144 looks up for a flow table entry corresponding to a session key of the header information extracted by the header information extraction part 143 from a flow table 145. Here, forwarding information corresponding to a session key and QoS information are stored in the flow table 145.

The decision part 146 decides whether a flow table entry corresponding to a session key exists using the results of the flow table lookup part 144.

When the flow table entry corresponding to the session key of the header information exists as a result of the decision by the decision part 146, the QoS/forwarding information extracting part 147 extracts forwarding information and QoS information corresponding to the session key from the flow table entry.

The output buffer 148 buffers and outputs a packet from the input buffer 142 under control of the controller 141. When there exists a flow table entry corresponding to a session key of header information, the controller 141 controls a packet introduced to the input buffer 142 to be forwarded through the output buffer 148 on the basis of the forwarding information and the QoS information extracted by the QoS/forwarding information extracting part 147.

On the other hand, when there does not exist the flow table entry corresponding to the session key of the header information as a result of the decision of the decision part 146, the controller 141 controls the QoS information extracting part 153 and the forwarding information extracting part 155 to detect QoS information and forwarding information, and forwards an introduced packet.

That is, when there does not exist the flow table entry corresponding to the session key of the header information as a result of the decision of the decision part 146, the QoS information extracting part 153 extracts QoS information from the QoS policy table 154 proposed by the present invention under the control of controller 141. The QoS policy table 154 stores a session key including flow label defined according to an embodiment of the present invention and QoS information corresponding thereto.

Also, when there does not exist the flow table entry corresponding to the session key of the header information as a result of the decision of the decision part 146, the forwarding information extracting part 155 extracts forwarding information from the FIBv6 table 156 under control of the controller 141. The FIBv6 table 156 stores forwarding information of a packet according to a routing path.

The flow table entry generating part 157 generates a flow table entry using the QoS information and forwarding information extracted by the QoS information extracting part 153 and the forwarding information extracting part 155. The controller 141 updates the flow table 145 using the flow table entry generated by the flow table entry generating part 157.

Figure 10:
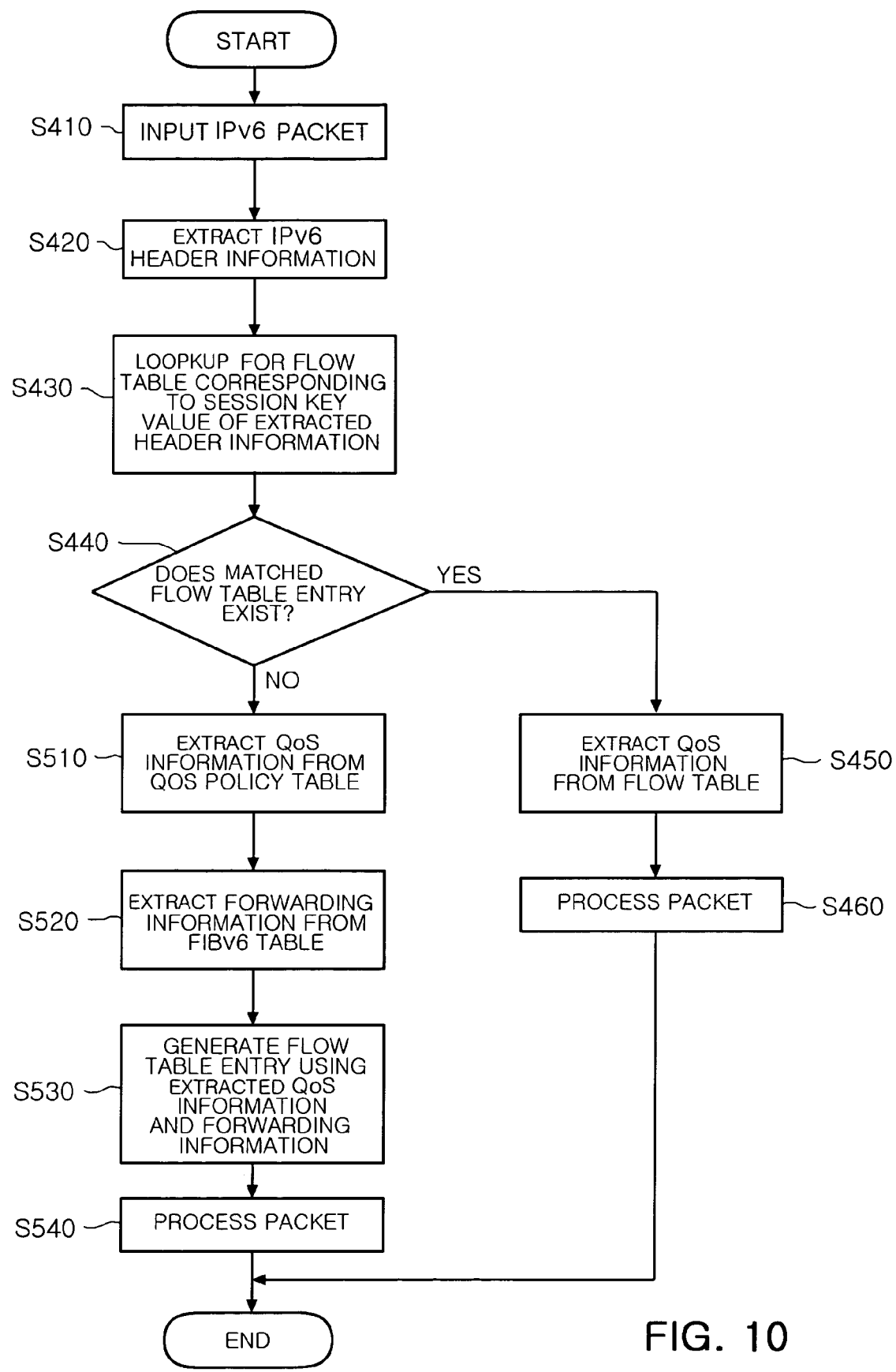
FIG. 10 is a flowchart illustrating a packet forwarding process of an IPv6 node according to an embodiment of the present invention.

FIG. 10 is a flowchart illustrating a packet forwarding process of an IPv6 node 140 according to an embodiment of the present invention.

First, when an IPv6 packet is input to the input buffer 142 to provide QoS for multimedia traffic of an IPv6(S410), the controller 141 controls the header information extraction part 143 to detect header information of an IPv6 packet introduced to the input buffer 142 (S420). When the header information of an IPv6 packet is extracted, the controller 141 controls the flow table lookup part 144 to look up for a flow table entry corresponding to a session key of the header information extracted by the header information extraction part 143 from the flow table 145 (S430).

When the lookup of the flow table entry corresponding to the session key of the header information is completed, the controller 141 controls the decision part 146 to decide whether there exists the flow table entry corresponding to the session key of the header information using results of the lookup of the flow table lookup part 144 (S440).

When there exists the flow table entry corresponding to the session key of the header information as a result of the decision of the decision part 146, the controller 141 controls the QoS/forwarding information extracting part 147 to detect forwarding information and QoS information corresponding to the session key of the header information from the an entry of the flow table 145 (S450). When the forwarding information and the QoS information corresponding to the session key of the header information are extracted from the entry of the flow table 145, the controller 141 controls the output buffer 148 to forward an IPv6 packet introduced to the input buffer 142 according to the forwarding information on the basis of the extracted QoS information (S460).

When there does not exist the flow table entry corresponding to the session key of the header information as a result of the decision of the decision part 146 in an operation S440, the controller 141 controls the QoS information extracting part 153 to detect QoS information from the QoS policy table 154 (S510). Also, the controller 141 controls the forwarding information extracting part 155 to detect forwarding information from the FIBv6 table 156 (S520).

Accordingly, when the QoS information and the forwarding information corresponding to the session key of the IPv6 packet header information by the QoS information extracting part 153 and the forwarding information extracting part 155, the controller 141 controls the flow table entry generating part 157 to generate a flow table entry using the extracted QoS information and forwarding information (S530). At this point, the controller 141 may update the flow table 145 using the flow table entry generated by the flow table entry generating part 157. Also, the controller 141 controls the output buffer 148 to forward an IPv6 packet introduced to the input buffer 142 according to forwarding information and the QoS information of the flow table entry generated by the flow table entry generating part 157 (S540).

As described above, session information is extracted from a signal exchanged for the communication connection between communication devices to generate a session key including flow label. QoS information corresponding to the generated session key is set so that an IPv6 node sets the QoS information as the QoS policy table does. Therefore, the IPv6 node can more easily perform session classification and QoS is guaranteed per each IPv6 session.

In addition, as a session is generated and QoS information is set to the session, the IPv6 node extracts QoS information and forwarding information from a flow table when there exits a flow table entry corresponding to a session key extracted from header information of an introduced IPv6 packet, and the IPv6 node extracts QoS information and forwarding information from a QoS policy table and an FIBv6 table when there does not exist the flow table entry. At this point, the IPv6 node forwards an IPv6 packet on the basis of the extracted forwarding and QoS information, thereby more easily performing a forwarding process where QoS is guaranteed in a high-speed interface regardless of existence of a flow table entry corresponding to a session key of an introduced packet.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A signal connection server in an IPv6 (Internet protocol version 6) network, the signal connection server comprising:
   a communication request signal transmission part for extracting destination information from a communication request signal transmitted from a source, and transmitting a communication request signal using the extracted destination information;
   a ring signal transmission part for receiving a ring signal received from a destination for which the communication request signal has been received, to detect the source from the ring signal and transmitting the ring signal to the extracted source;
   a session information transmission part for receiving a communication request response signal transmitted from the destination in response to the transmitted communication request signal to detect session information, and transmitting the extracted session information to a QoS provisioning server for providing QoS; and
   a communication request response signal transmission part for, when QoS provisioning completion information is received from the QoS provisioning server in response to a session key of the transmitted session information wherein the session key includes a next header value of the session information, transmitting a communication request response signal received from the destination to the source to set a session where QoS is guaranteed between the source and the destination.

2. The signal connection server of claim 1, wherein the session key includes a flow label of the session information.

3. The signal connection server of claim 2, wherein the session key further includes SRC IPv6 (Source Internet Protocol Version 6) address and DST IPv6 (Destination Internet Protocol Version 6) address of the session information.

4. The signal connection server of claim 3, wherein the QoS provisioning by the QoS provisioning server comprises:
   creating session keys for the session information; and
   setting QoS information corresponding to each of the session keys.

5. The signal connection server of claim 4, wherein the QoS information includes at least one of traffic type information and bandwidth information of a packet to be forwarded by the session key.

6. A QoS provisioning server in an IPv6 network, the QoS provisioning server comprising:
   a session key generating part for generating a session key including flow label on the basis of session information received for session setting between a source and a destination and a next header value of the session information;
   a QoS provisioning part for setting QoS information corresponding to the generated session key;
   a QoS provisioning information transmission part for transmitting the session key and the QoS information to an IPv6 node forwarding a data packet between the source and the destination; and
   a QoS provisioning completion information transmission part for transmitting QoS provisioning completion information corresponding to the session key to a signal connection server relaying session setting between the source and the destination.

7. The QoS provisioning server of claim 6, wherein the session key further includes SRC IPv6 address and DST IPv6 address of the session information.

8. The QoS provisioning server of claim 7, wherein the QoS information includes at least one of traffic type information and bandwidth information of a packet to be forwarded by the session key at the IPv6 node.

9. An IPv6 node comprising:
   a header information extraction part for extracting header information from a packet introduced from an IPv6 network;
   a flow table for generating a session key including flow label from session information between a source and a destination and a next header value of the session information, setting QoS information in response to the session key to store QoS information, and forwarding information provided by a QoS provisioning server in order to guarantee QoS;

a flow table lookup part for looking up a flow table for a flow table entry corresponding to a session key of the header information;

a QoS and forwarding information extracting part for, when the flow table entry corresponding to the session key of the header information exists on the flow table, extracting QoS information, and forwarding information corresponding to the session key of the header information from the flow table; and a controller forwarding the introduced packet according to the forwarding information on the basis of the extracted QoS information.

10. The IPv6 node of claim 9, further comprising:

a QoS information extracting part for, when the flow table entry corresponding to the session key of the header information does not exist on the flow table, extracting QoS information of the introduced packet from a QoS policy table storing session key and QoS information provided by the QoS provisioning server; and a forwarding information extracting part for extracting forwarding information of the packet from an FIBv6 (forwarding information base table version 6) table containing forwarding information corresponding to a routing path of the packet, wherein the controller forwards the introduced packet according to forwarding information extracted by the forwarding information extracting part on the basis of the QoS information extracted by the QoS information extracting part.

11. The IPv6 node of claim 10, further comprising a flow table entry generating part for generating an entry of the flow table using the QoS information extracted by the QoS information extracting part and the forwarding information extracted by the forwarding information extracting part.

12. The IPv6 node of claim 11, wherein the session key contained in the flow table provided by the QoS provisioning server further includes SRC IPv6 address and DST IPv6 address.

13. The IPv6 node of claim 12, wherein the QoS information provided by the QoS provisioning server includes at least one of traffic type information and bandwidth information of the packet to be forwarded by the session key provided by the QoS provisioning server.

14. An IPv6 network system comprising:

a signal connection server for extracting session information from a communication request response signal transmitted from a destination in response to a communication request signal of a source and transmitting the extracted session information, and, when QoS provisioning completion information is received in response to a session key of the transmitted session information, transmitting the communication request response signal received from the destination to the source;

a QoS provisioning server for generating a session key including flow label from the session information transmitted from the signal connection server destination and a next header value of the session information, setting and transmitting QoS information corresponding to the session key, and transmitting the QoS provisioning completion information to the signal connection server; and an IPv6 node for updating a QoS policy table using the session key and QoS information transmitted from the QoS provisioning server to forward an introduced packet on the basis of the session key and the QoS information.

15. The IPv6 network system of claim 14, wherein the session key further includes SRC IPv6 address, DST IPv6 address, and next header value of the session information.

16. The IPv6 network system of claim 14, wherein the QoS information includes at least one of traffic type information and bandwidth information of the packet to be forwarded by the IPv6 node according to the session key provided by the QoS provisioning server.

17. A QoS providing method of an IPv6 network, the method comprising:

extracting, at a signal connection server, session information from a communication request response signal transmitted from a destination in response to a communication request signal of a source and transmitting the extracted session information to a QoS provisioning server;

receiving, at the QoS provisioning server, the session information, generating a session key including flow label and a next header value of a packet header, and setting QoS information corresponding to the session key;

transmitting, at the QoS provisioning server, the session key and the QoS information to an IPv6 node forwarding a packet, and transmitting QoS provisioning completion information to the signal connection server;

when the signal connection server receives the QoS provisioning completion information, transmitting the communication request response signal received from the destination to the source; and forwarding, at the IPv6 node, an introduced packet on the basis of the session key and the QoS information transmitted from the QoS provisioning server.

18. The method of claim 17, wherein the forwarding, at the IPv6 node, comprises:

extracting header information from the introduced packet;

looking up for a flow table entry corresponding to a session key of the header information from a flow table storing forwarding information required for routing and QoS information transmitted from the QoS provisioning server;

when the flow table entry corresponding to the session key of the header information exists on the flow table, extracting QoS information and forwarding information corresponding to the session key of the header information from the flow table; and forwarding the introduced packet according to the forwarding information an the basis of the extracted QoS information.

19. The method of claim 18, further comprising:

when the flow table entry corresponding to the session key of the header information does not exist on the flow table, extracting QoS information of the introduced packet from a QoS policy table storing the session key and the QoS information provided from the QoS provisioning server;

extracting forwarding information of the packet from an forwarding information base version 6 (FIBv6) table containing forwarding information corresponding to a routing path of the packet; and forwarding the introduced packet according to the forwarding information on the basis of the extracted QoS information.

20. The method of claim 19, further comprising creating an entry of the flow table using the extracted QoS information and forwarding information to update the flow table 21. The method of claim 20, wherein the session key further includes SRC IPv6 address and DST IPv6 address.

22. The method of claim 21, wherein the QoS information includes at least one of traffic type information and bandwidth information of the packet to be forwarded by the IPv6 node according to the session key provided by the QoS provisioning server.

* * * * *